United States Patent
Louarn et al.

(10) Patent No.: US 7,703,701 B2
(45) Date of Patent: Apr. 27, 2010

(54) SYSTEM FOR THE SPRAYING OF SPRAY LIQUID FOR AIRCRAFT WINDSHIELD, AND COCKPIT PROVIDED WITH SUCH A SPRAYING SYSTEM

(75) Inventors: Amelie Le Louarn, Tournefeuille (FR); Gilles Chene, Toulouse (FR)

(73) Assignee: Airbus France (FR)

( * ) Notice: Subject to any disclaimer, the term of this patent is extended or adjusted under 35 U.S.C. 154(b) by 371 days.

(21) Appl. No.: 11/762,892

(22) Filed: Jun. 14, 2007

(65) Prior Publication Data

US 2008/0308649 A1 Dec. 18, 2008

(30) Foreign Application Priority Data

Jun. 26, 2006 (FR) .................................. 06 52648

(51) Int. Cl.
*B05B 1/10* (2006.01)
(52) U.S. Cl. ................................ 239/284.1; 239/284.2
(58) Field of Classification Search ............. 239/284.1, 239/284.2, 67, 70; 15/250.01, 250.02, 250.05; 134/95.2, 102.3
See application file for complete search history.

(56) References Cited

U.S. PATENT DOCUMENTS

| 2,240,013 | A | * | 4/1941 | Gale | 239/131 |
| 2,968,071 | A | * | 1/1961 | Di Perna | 239/284.1 |
| 3,231,196 | A | | 1/1966 | Gunnar et al. | |
| 3,633,827 | A | | 1/1972 | Novak | |
| 3,647,167 | A | | 3/1972 | Schiller | |
| 3,901,444 | A | | 8/1975 | Maltbie et al. | |
| 6,554,210 | B2 | * | 4/2003 | Holt et al. | 239/284.2 |
| 6,921,028 | B2 | * | 7/2005 | Hiraki et al. | 239/127 |
| 7,040,328 | B2 | * | 5/2006 | Woodard | 134/95.2 |

FOREIGN PATENT DOCUMENTS

DE 10115398 A1 10/2002

* cited by examiner

*Primary Examiner*—Davis Hwu
(74) *Attorney, Agent, or Firm*—Perman & Green LLP

(57) ABSTRACT

A system for spraying liquid for a windshield of an aircraft includes a spray-liquid supply circuit, a pressurized-gas supply circuit designed to purge the spray-liquid supply circuit, and at least one nozzle disposed downstream from the circuits and designed to spray the spray liquid and pressurized gas on an aircraft windshield, wherein the system includes a control device able to simultaneously actuate the temporary spraying of spray liquid and of pressurized gas respectively in the spray-liquid spraying circuit and in the pressurized-gas spray circuit in such a way that a pressurized-gas spraying time is strictly greater than a spraying-liquid spraying time. For example, the control device includes a time-lag relay controlling the pressurized-gas supply circuit.

18 Claims, 3 Drawing Sheets

SYSTEM FOR THE SPRAYING OF SPRAY LIQUID FOR AIRCRAFT WINDSHIELD, AND COCKPIT PROVIDED WITH SUCH A SPRAYING SYSTEM

BACKGROUND

1. Field

The disclosed embodiments relate to a system for the spraying of spray liquid for aircraft windshields. More specifically, the disclosed embodiments relate to a purging device used to clean a spray system of this kind and eliminate all traces of spray liquid from the piping system after the spraying of such liquid. The disclosed embodiments also relates to an aircraft cockpit comprising at least one such system for the spraying of spray liquid.

When an aircraft is in flight, and in the event of heavy rain, there are known ways of improving visibility inside the aircraft cockpit by spraying a water-repellent comprising hydrophobic agents, most often consisting of silicone or solvent, on the exterior of the windshield of said cockpit. The water-repellent is preferably used when the aircraft is in flight because, when the aircraft is on the ground, the water-repellent liquid cannot be sprayed fast enough on the windshield.

2. Description

There are known prior-art spraying systems integrated into aircraft and enabling the spraying, on command, of the water-repellent liquid on the windshield of the cockpit.

FIG. 1, pertaining to the prior art, gives a schematic view of a water-repellent spraying system 1 of this kind for aircraft windshields.

The water-repellent liquid spraying system 1 is provided with a water-repellent liquid supply circuit 2 comprising a piping system 3 designed to convey the water-repellent liquid from a tank 4, at a distance from the windshield 6, up to two nozzles 5 situated at the level of the windshield 6 of the aircraft cockpit. The water-repellent liquid is projected up to the nozzles 5 through pressure within the tank 4. Generally, when said tank is full, the pressure in said tank 4 is at five bars. When the tank is empty, the pressure falls to two bars.

The aircraft pilot and/or co-pilot exercise remote control over the opening of the valves 7, situated upstream from the nozzles 5, so as to let the water-repellent liquid flow up to the nozzles 5. The term "upstream" refers to that which comes before the point considered, in the sense of flow of liquid in the supply circuit 2. When the valves 7 are closed, they block the pressurized water-repellent liquid within the piping system 3. In the event of heavy rain, to improve visibility through the windshield 6, the pilot and/or co-pilot press the control button 8 situated in the cockpit, thus actuating the temporary opening of the valves 7. When water-repellent liquid no longer needs to be sprayed on the windshield 6, the pilot and/or co-pilot releases the control button 8, thus closing the valves 7. The flow of water-repellent liquid is once again blocked upstream relative to the nozzles 5, at the valves 7.

The water-repellent liquid used to improve visibility through the windshield 6 has the main drawback of gradually clogging the piping system by the accumulated depositing of silicone on the walls of the piping system and in the nozzles 5. There is therefore a known way of draining the portion 9 of the supply circuit 2 situated downstream from the valves 7 so as to clean the piping system and the nozzles 5 once the water-repellent liquid has been sprayed on the windshield 6.

In the prior art, as shown in FIG. 1, the purging device 10 has a tubing 11 constantly conveying pressurized air tapped at the aircraft engines, provided that the engines are working, from a collector 12 to the nozzles 5, passing through the portion 9 of the piping system 3 of the supply circuit 2 situated downstream from the valves 7. Thus, the assembly formed by said portion 9 and the nozzles 5 is purged of any residue of water-repellent liquid that may get deposited once the valves 7 are closed. Furthermore, and in order to prevent any water-repellent liquid that may be contained in the downstream portion 9 of the piping system 3 of the supply circuit 2 from flowing inside the tube 11 of the purging device 10, it is possible to provide said purging device 10 with backflow check valves 13 positioned at the connection between the tube 11 of the purging device 10 and the piping system 3 of the water-repellent liquid supply circuit 2. The backflow check valves 13 permit the passage of compressed air toward the nozzles 5 and prevent the water-repellent liquid from flowing in the reverse direction.

In order that the water-repellent liquid may be sprayed before the pressurized gas when visibility through the windshield 6 has to be improved, there are known ways of maintaining the pressure of compressed air in the tube 11, at the inlet of the backflow check valves 13, at a pressure that is approximately equal to 60 millibars and in any case strictly below the pressure of the water-repellent liquid. In general, the pressure of the water-repellent liquid ranges from 5 bars to 2 bars since there is little loss of pressure during the journey in the piping system 3 of the supply circuit 2.

The circuit 2 for the supply of water-repellent liquid is actuated at specific times by the pilot and/or co-pilot when they need to improve visibility through the windshield 6, while the purge device 10 works constantly provided that the engines are in operation, pressurized air being continuously blown on the windshield 6.

Such a system therefore tends to disturb the performance of the aircraft since the pressurized air is continually tapped from these engines, thus entailing a harmful loss of load. Furthermore, the tubing 11 of the pressurized air supply circuit may be weakened by the continuous flow of pressurized air that it conveys.

Another drawback of the prior-art purging device 10 is that it necessitates the use of a tubing 11 that transits from the nose of the aircraft to the central section of said aircraft in which the turbo-jet engines are situated. The tube 11 has a length approximately equal to 30 meters and is subjected to numerous constraints since the pressurized gas flows therein constantly.

Furthermore, the installation of the purging device 10 is a lengthy, complex process. For, it is necessary to define the tubing 11 with the constraints of segregation of the systems, use fixed supports spaced out at intervals of 0.5 meters approximately and hence pierce the structure of the aircraft in order to fix these supports. The piercing in itself requires validation design studies to ensure that it does not inappropriately weaken the structure of the aircraft. Furthermore, it is necessary to match the definitions of the tubing portions from one aircraft section to another, manufacture, bend, equip and protect the entire tube 11, install the tubing portions on each of the aircraft sections etc. The test procedure can be performed only when the entire purging device 10 is connected together on the final assembly line. The test therefore can only be done once the aircraft has been assembled and the purging device 10 has been positioned, thus making it necessary to have specific tools for the pressurizing of the pneumatic circuit. The phases of the definition, manufacture, installation and testing of the prior-art purging device 10 thus entail a major loss of time.

In one embodiment, it is sought to provide a purging device that does not entail major load losses in the aircraft engines.

To this end, the disclosed embodiments propose to replace the permanent spraying of compressed air from the purging device with a time-specific spraying, on demand, of pressurized gas. The term "time-specific spraying" refers to spraying with limited duration.

The purging device according to one embodiment works for a specified limited time when it is necessary to purge the spray-liquid supply circuit for windshields so that, outside periods of heavy rain, or another situation requiring the spraying of liquid on the windshield, no fluid is sprayed on said windshield. So as to simplify use for the pilot and/or co-pilot, the purging device according to one embodiment is actuated simultaneously with the opening of the valve releasing the passage of the spray liquid to the windshield. A single command enables two actions, namely the spraying of spray liquid and the spraying of compressed gas. However, in one embodiment, although the spraying of the liquid and the gas are initiated simultaneously, the stopping of the spraying of said gas is offset in time relative to the spraying of the spray liquid. More specifically, the spraying of compressed gas stops after the stopping of the spraying of the spray liquid. This time offset between the end of the two spraying operations, even when the actuation is performed by the same action, is permitted through the use of means capable of prolonging in time the transmission of one of the pieces of information.

Thus, as in the prior art, the users have only one action to perform. However, this single action enables the commanding of two different spraying operations that are offset in time.

Naturally, it is possible to install the prolonged-action purging device of the disclosed embodiments directly on the prior-art spray liquid spraying system which uses compressed air tapped from the engines of the aircraft. Such a solution has the advantage whereby it can be used on aircraft already in service without its being necessary to carry out successive major dismantling and reinstallation operations.

Advantageously, the disclosed embodiments use an auxiliary compression device capable of tapping air directly at the place where it is situated, thus enabling the elimination of the entire tubing length for conveying gas from a particular place where it is tapped up to the nozzles. Indeed, if the compression device is available in the vicinity of the nozzles and therefore the windshield the length of tubing needed to convey compressed gas is reduced. Furthermore, it is possible to install the entire equipment of the purging device of the disclosed embodiments directly in the nose of the aircraft. Thus, the general space requirement of the purging device is reduced. Furthermore, once the purging device is installed on connected, the test can be done immediately. It is not necessary to provide pressurized air since the compression device can make direct use of the air available in the vicinity. Furthermore, this approach can be used to spray not only but also any gas on the windshield, as needed, through the availability of the air in an auxiliary tank containing the desired gas.

SUMMARY

An aspect of the disclosed embodiments is a system for spraying liquid for a windshield of an aircraft comprising a spray liquid supply circuit, a pressurized-gas supply circuit designed to purge the spray liquid supply circuit, and at least one nozzle disposed downstream from said circuits and designed to spray the spray liquid and pressurized gas on a windshield, wherein the system comprises a control device able to simultaneously actuate the temporary spraying of spray liquid and of pressurized gas respectively in the spray-liquid spraying circuit and in the pressurized-gas spray circuit in such a way that a pressurized gas spraying time is strictly greater than a spray-liquid spraying time.

The term "temporary spraying" is understood to mean that the spraying is limited in time, as compared with permanent or constant spraying The spray liquid may, for example, be a water-repellent liquid used to drive out the drops of water from the windshield in the event of rain, a cleansing liquid comprising cleansing agents or a mixture of both.

The pressurized gas may be air, or else a gas tapped from a specific bottle containing, for example, oxygen, nitrogen or the like.

According to examples of embodiments of the spraying system, it is possible to provide for all or part of the following characteristics:

the control device has a time-lag relay controlling the pressurized-gas supply circuit—the pressurized-gas supply circuit has compression means to compress the air intended for circulation in said circuit. These compression are auxiliary or ancillary compression means in the sense that they are added on to the spraying systems specifically to compress the gas to be sprayed. It is no longer the engines of the aircraft in which the spraying system is installed that compress the gas but specific means. This makes it possible especially to install the compression means in the vicinity of the windshield and therefore reduce the length of the tubing systems designed to convey the compressed gas up to said windshield.

For example, one embodiment uses a compressor enabling the tapping of air at a given pressure and its compression until the desired pressure is obtained. It is also possible to use a DC motor or a monophase or triphase AC motor or any means capable of compressing gas.

the compression means comprise a compressor working in DC or AC mode positioned downstream from the air tap of said pressurized-gas supply circuit.

the pressurized-gas supply circuit comprises an air tap capable of tapping pressurized gas from an engine of an aircraft. In this case, the piping of the pressurized-gas supply circuit is used to convey the pressurized gas from the engine or engines up to the nozzle.

the pressurized-gas supply circuit has a filter positioned at the level of the air tap of said pressurized-gas supply circuit.

the pressurized-gas supply circuit is provided with at least one backflow check valve capable of preventing the passage of spray liquid in the portion of the pressurized-gas supply circuit positioned upstream from said backflow check valve.

the pressurized-gas supply circuit is provided with a recovery tank capable of receiving the spray liquid flowing in the pressurized-gas supply circuit, in the event of a malfunction of the valves.

the pressure of the pressurized gas flowing in the pressurized-gas supply circuit is strictly lower than the pressure of the spray liquid flowing in the spray-liquid supply circuit, when they reach the nozzles. By maintaining air pressure at a level strictly below the pressure of the spray liquid, it is ensured that the spray liquid is sprayed at the nozzles before the pressurized gas.

Another aspect of the disclosed embodiments is an aircraft cockpit comprising at least one system for the spraying of spray liquid.

Advantageously, and in order to reduce the general space requirement of the spraying device according to one embodiment, and more particularly of the purging device, specific compression means can be positioned beneath the floor of the cockpit so that they are in the immediate vicinity of the windshield. Thus is it possible to use gas situated in the vicinity of the cockpit and pressurized by the compression means housed in the cockpit. The tubing of the pressurized-gas supply circuit has a reduced length as compared with the length needed to convey pressurized gas from the engines of the aircraft.

Furthermore, the pressurized gas air tap can be taken directly beneath the floor of said cockpit. In this case, the fact of tapping air beneath the floor of the cockpit creates a tiny air leak since in flight, below a certain attitude, the air pressure within the aircraft is higher than the air pressure outside the aircraft. Naturally, air can also be tapped outside the cockpit of the aircraft in an unpressurized zone to prevent even a tiny risk of leakage. It is possible to provide for a tightly sealed air tap in the radome, i.e. the nose of the aircraft generally comprising a radar, or on the skin of the aircraft.

BRIEF DESCRIPTION OF THE DRAWINGS

The disclosed embodiments will be understood more clearly from the following description and the accompanying figures. These figures are given by way of an indication and in no way restrict the scope of the embodiments. Of the figures.

DETAILED DESCRIPTION

Figure 1:
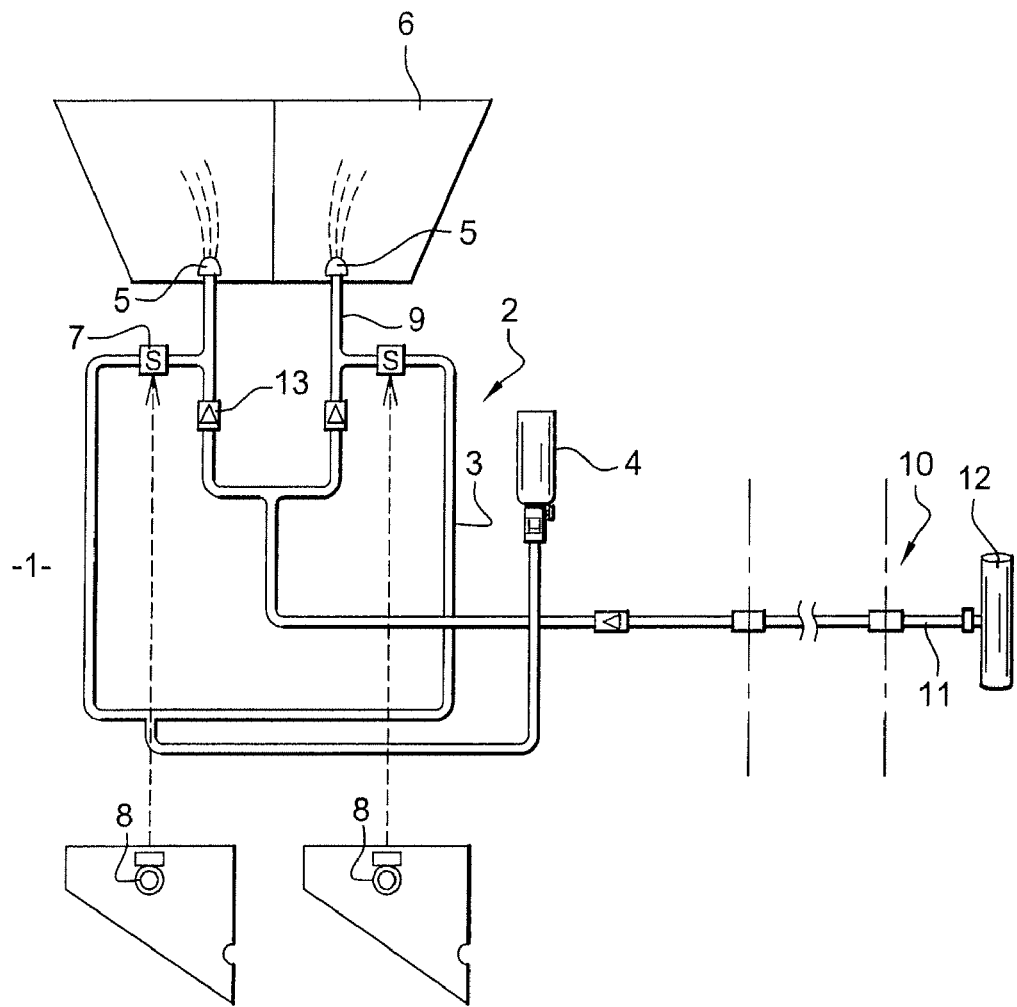
FIG. 1 is a schematic view of an already described prior-art system for the spraying of spray liquid.
Figure 2:
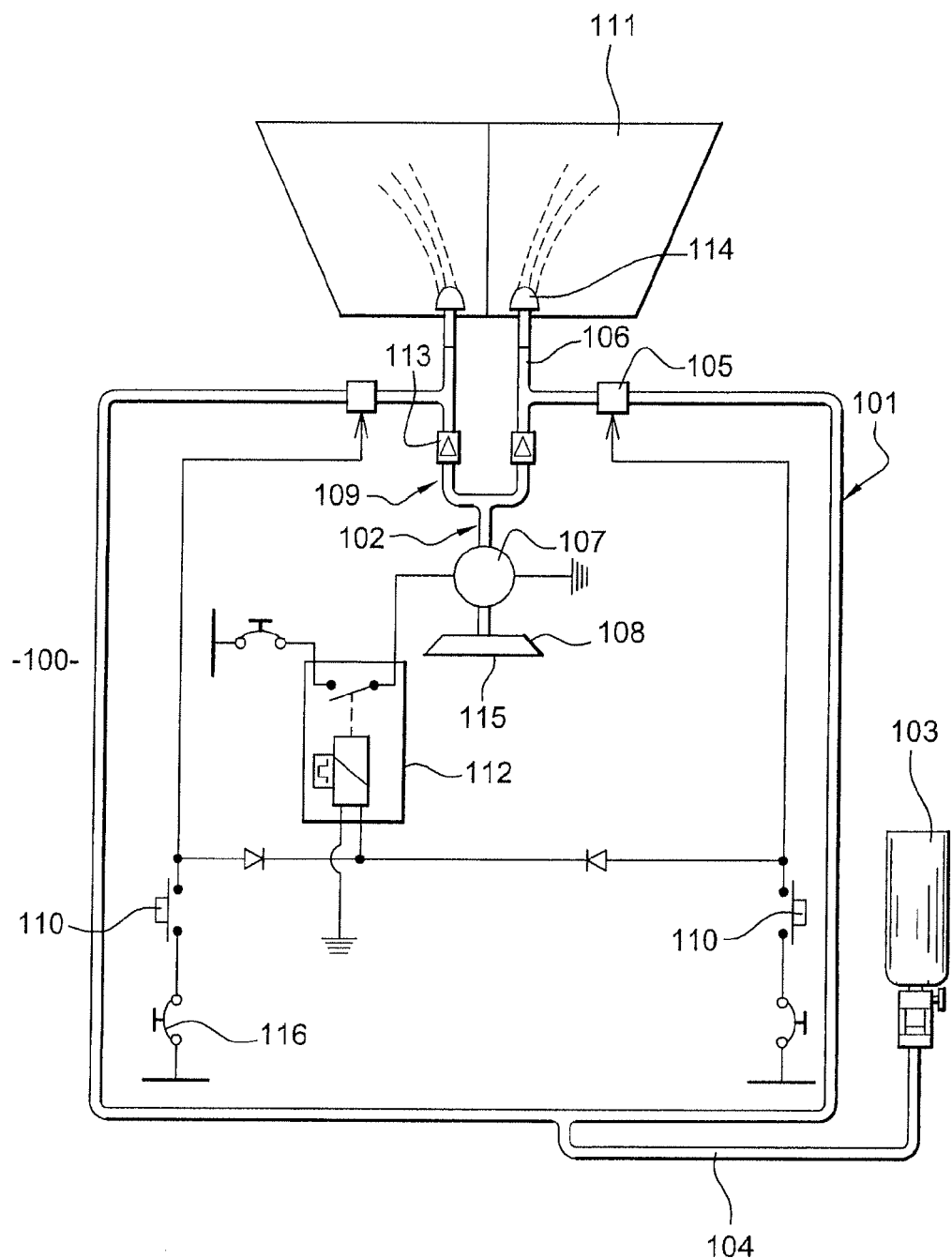
FIG. 2 is a schematic view of a system for the spraying of spray liquid according to one embodiment.

FIG. 2 shows a system 100 for the spraying of spray liquid for windshields 111 according to one embodiment. The spraying system 100 comprises a spray-liquid supply circuit 101 and a pressurized-gas supply circuit 102.

The spray-liquid supply circuit 101 has a tank 103 containing pressurized spray liquid. A first piping portion 104 is used to convey the pressurized spray liquid from the tank 103 to valves 105 blocking the pressurized spray liquid in this first piping portion 104 when the spraying system 100 is not actuated. The valves 105 of the spray-liquid supply circuit 101, when actuated, permit the passage of the spray liquid into the second piping portion 106 of the spray-liquid supply circuit 101, this second piping portion 106 enabling the pressurized spray liquid to be conveyed from the valve 105 up to the nozzles 114.

The pressurized-gas supply circuit 102 has an auxiliary compressor 107 capable of constantly compressing air tapped at the level of an air tap 108, directly in the position where said air tap 108 is situated. The air tap 108 is advantageously equipped with a filter. Once the filtered, tapped air passes into the compressor 108, the pressurized gas is conveyed up to the nozzles 114 by a first tubing portion 109 that leads into the second piping portion 106 also belonging to the spray-liquid supply circuit 101. in crossing the second piping portion 106 of the spray-liquid supply circuit 101, which also belongs to the pressurized-gas supply circuit, and then into the nozzles 114, the pressurized gas removes every trace of residual spray liquid and hence purges the spray-liquid supply circuit 101 from the second piping portion 106 up to the nozzles 114.

As shown in FIG. 2, one and the same electronic control device 116, actuated here by a pushbutton 110, is used to actuate the opening of the valves 105 and the compressor 107. The actuation of the compressor 107 leads to the tapping of air at the air tap 108, its compression by the compressor 107 and the conveying of the air to the windshield 111.

The actuation of the compressor 107 and therefore of the pressurized-gas supply circuit 102 is prolonged in time as compared with the actuation of the spray-liquid supply circuit 101 through a time-lag relay 112 which keeps the compressor 107 still activated for a pre-determined period of time $\Delta t$. For example, $\Delta t$ is set at one second at least. The choice of $\Delta t$ depends chiefly on the nature of the liquid. For example, the richer the spray liquid in silicone, the more necessary is it to prolong the spraying of pressurized gas in the tubing and the nozzles in order to purge them entirely.

Inasmuch as the spraying of spray liquid and pressurized gas is partially concomitant, it is planned to use pressurized gas at a pressure strictly lower then the pressure of the spray liquid.

Instead of a specific time-lag relay 112, it is possible to use a computation unit designed for other functions on the aircraft which will be programmed to integrate the additional time-lag relay function.

The spraying of spray liquid, like the spraying of pressurized gas, is temporary. Indeed, when the control device 116 is no longer actuated, the spraying of spray liquid stops immediately and is followed, with an offset time whose length varies according to $\Delta t$, by the stopping of the spraying of pressurized gas.

In order to prevent the accidental flow of spray liquid in the pressurized-gas supply circuit 102, which could damage the compressor 107, it is possible to provide the pressurized-gas supply circuit 102 with backflow check valves 113. The backflow check valves 113 prohibit the passage of any fluid from the nozzles 114 to the compressor 107, but permit the passage of pressurized gas from the compressor 107 to the nozzles 114.

It is possible to provide for a filter 115 at the air tap 108 so as not to introduce any pollution into the compressor 107 and into the piping 109, 106 and the nozzles 114.

So as to reduce the total weight of the purging device of the disclosed embodiments, i.e. of the pressurized-gas supply circuit 102, advantageously a low-mass compressor 107 is used. For example, a compressor weighing about 0.5 kg, working at a voltage of 28 V DC with a maximum amperage of 0.5 to 1 A, is used.

As shown in FIG. 2, it is possible to provide several control buttons 110 to actuate the control device 116. The control buttons 110 may be positioned at different places in the cockpit, or even outside the cockpit. Thus, the pilot and co-pilot can each actuate the spray liquid spraying system 100 independently.

Figure 3:
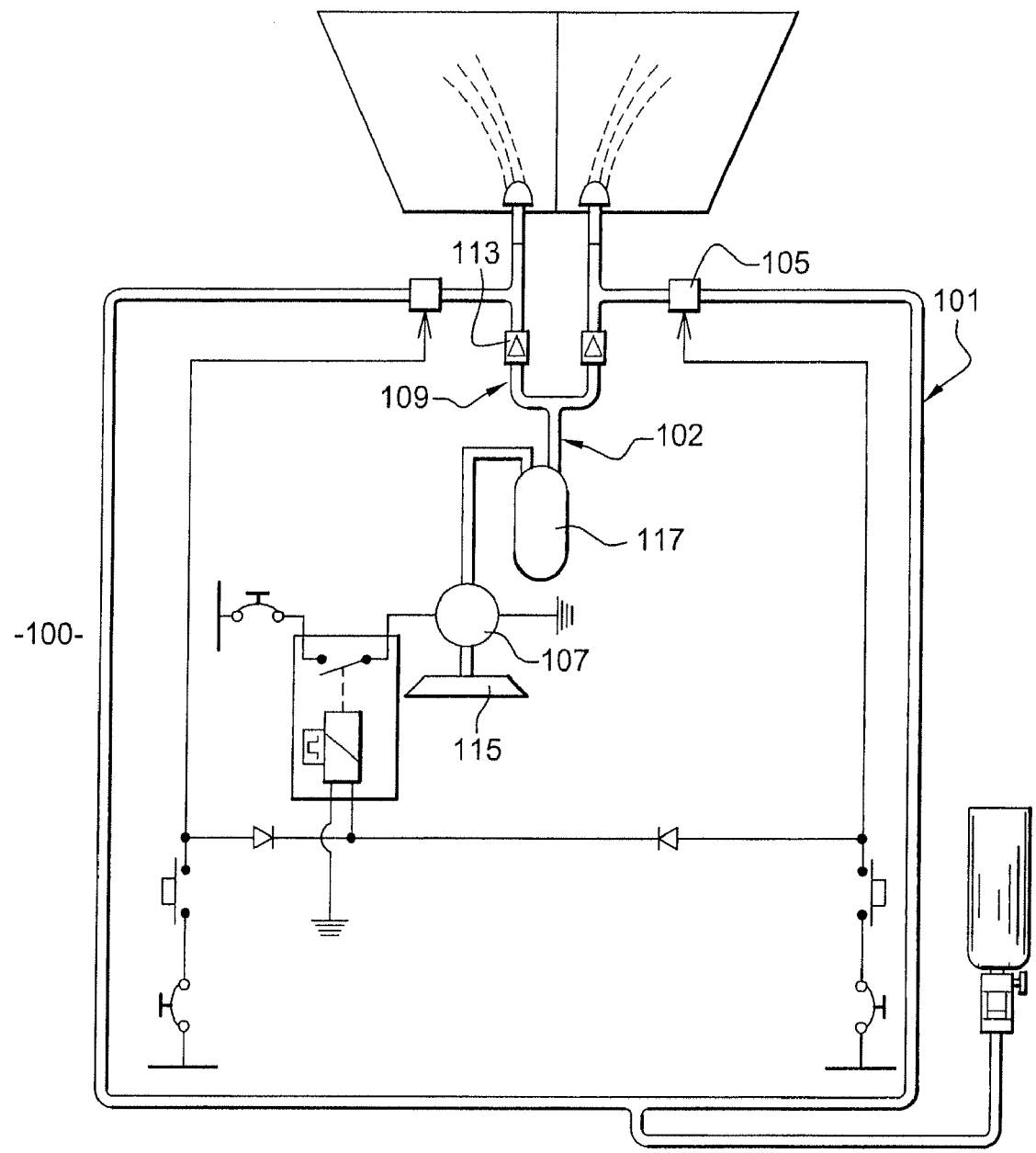
FIG. 3 is a schematic view of a system for the spraying of spray liquid according to another embodiment.

FIG. 3 shows a variant of the pressurized-gas supply circuit 102 according to the disclosed embodiments. In this example, the pressurized-gas supply circuit 102 additionally has a recovery tank 117. The tank 117 is designed to receive the spray liquid which would flow accidentally into the piping 109 of the pressurized-gas supply circuit 102 in the event of failure of the backflow check valves 113 and the valves 105 positioned downstream from the compressor 107. It is thus ensured that no spray liquid would accidentally penetrate the compressor 107, thus entailing a risk of damaging it irreversibly.

Depending on examples of embodiments of the disclosed embodiments, it is possible to use alternating current or direct current. For, in an aircraft, two types of current are available, i.e. alternating current when the engines are in operation and direct current when the aircraft is on the ground and in flight. Inasmuch as the system for the spraying of spray liquid is used only when the aircraft is in flight, and hence when the engines are in operation, it is possible to use alternating current to power the spraying system.

Should a triphase, asynchronous AC motor be used to compress the air from the air tap 108 before being sprayed on the windshield 111, it is necessary to use a relay placed between the time-lag relay 112 and the three phases of the triphase motor to achieve the time lag Δt on all three phases. A triphase motor of this kind calls for a greater volume of electric wiring and an additional electronic relay part. It is therefore preferred to use a monophase alternating-current motor whose effective power is quite sufficient for a compression, for example Frager-turn type motors or motors with capacitors.

The invention claimed is:

1. A system for spraying liquid for a windshield of an aircraft comprising a spray-liquid supply circuit, a pressurized-gas supply circuit designed to purge the spray-liquid supply circuit, the spray-liquid circuit and the pressurized-gas supply circuit being combined to form a combined liquid-gas supply circuit at an end of the spray-liquid circuit to be purged, and at least one nozzle being coupled to the combined liquid-gas supply circuit and disposed downstream from said circuits and designed to spray the spray liquid and pressurized gas on an aircraft windshield, wherein the system comprises a control device able to simultaneously actuate the temporary spraying of spray liquid and of pressurized gas respectively in the spray-liquid spraying circuit and in the pressurized-gas spray circuit in such a way that a pressurized-gas spraying time is strictly greater than a spraying-liquid spraying time, and wherein the pressure of the pressurized gas flowing in the pressurized-gas supply circuit is strictly lower than the pressure of the spray liquid flowing in the spray-liquid supply circuit, when they reach the nozzles.

2. A system for spraying spray liquid according to claim 1, wherein the control device has a time-lag relay controlling the pressurized-gas supply circuit.

3. A system for spraying spray liquid according to claim 1, wherein the pressurized-gas supply circuit has compression means to compress the air intended for circulation in said circuit.

4. A system for spraying spray liquid according to claim 3, wherein the compression means comprise a compressor positioned downstream from the air tap of said pressurized-gas supply circuit.

5. A system for spraying spray liquid according to claim 1, wherein the pressurized-gas supply circuit comprises an air tap capable of tapping pressurized gas from an engine of an aircraft.

6. A system for spraying spray liquid according to claim 1, wherein the pressurized-gas supply circuit has a filter positioned at the level of the air tap of said pressurized-gas supply circuit.

7. A system for spraying spray liquid according to claim 1, wherein the pressurized-gas supply circuit is provided with at least one backflow check valve capable of preventing the passage of spray liquid in the portion of the pressurized-gas supply circuit positioned upstream from said backflow check valve.

8. A system for spraying spray liquid according to claim 1, wherein the pressurized-gas supply circuit is provided with a recovery tank capable of receiving the spray liquid flowing in the pressurized-gas supply circuit.

9. An aircraft cockpit comprising at least one system for spraying spray liquid according to claim 1.

10. An aircraft cockpit according to claim 9, wherein compression means to compress the gas designed to flow in the pressurized-gas supply circuit are positioned beneath the floor of said cockpit.

11. An aircraft cockpit according to claim 9, wherein the air tap of the pressurized-gas supply circuit is situated beneath the floor of said cockpit.

12. An aircraft cockpit according to claim 9, wherein the air tap of the pressurized-gas supply circuit is situated in the radome.

13. An aircraft cockpit according to claim 9, wherein the air tap of the pressurized-gas supply circuit is situated on the external skin of the cockpit.

14. The aircraft cockpit according to claim 9 wherein the spray-liquid supply circuit and the pressurized-gas supply circuit are coupled together by at least one check valve to form a combined liquid-gas supply circuit.

15. The system for spraying liquid for a windshield of an aircraft according to claim 1 wherein the spray-liquid supply circuit and the pressurized-gas supply circuit are coupled together by at least one check valve to form a combined liquid-gas supply circuit.

16. The system for spraying liquid for a windshield of an aircraft according to claim 1 further comprising at least one check valve between the spray-liquid supply circuit and the pressurized-gas supply circuit prior to the single liquid-gas supply circuit.

17. A system for spraying liquid for a windshield of an aircraft comprising a spray-liquid supply circuit, a pressurized-gas supply circuit designed to purge the spray-liquid supply circuit, and at least one nozzle disposed downstream from said circuits and designed to spray the spray liquid and pressurized gas on an aircraft windshield, wherein the system comprises a control device able to simultaneously actuate the temporary spraying of spray liquid and of pressurized gas respectively in the spray-liquid spraying circuit and in the pressurized-gas spray circuit, wherein a pressurized-gas spraying time is strictly greater than a spraying-liquid spraying time, and the pressure of the pressurized gas flowing in the pressurized-gas supply circuit is strictly lower than the pressure of the spray liquid flowing in the spray-liquid supply circuit, when they reach the nozzles.

18. The aircraft cockpit according to claim 17 wherein spray-liquid supply circuit and the pressurized-gas supply circuit are combined into a single liquid-gas supply circuit, the at least one nozzle being coupled to the single liquid-gas supply circuit.

* * * * *